(12) United States Patent
Susa et al.

(10) Patent No.: US 6,694,588 B2
(45) Date of Patent: Feb. 24, 2004

(54) METHOD OF RENOVATING AND RECYCLING A VEHICLE

(75) Inventors: Daisuke Susa, Wako (JP); Kotaro Shige, Wako (JP); Masataka Kumata, Wako (JP); Fusataka Bannai, Wako (JP); Kenji Kobayashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/942,124

(22) Filed: Aug. 30, 2001

(65) Prior Publication Data

US 2002/0049609 A1 Apr. 25, 2002

(30) Foreign Application Priority Data

Aug. 30, 2000 (JP) ........................................ 2000-260733
Sep. 27, 2000 (JP) ........................................ 2000-293247

(51) Int. Cl.$^7$ ............................ B23P 19/04; B23P 6/00; B07B 13/00
(52) U.S. Cl. ................... 29/403.3; 29/403.1; 29/402.01
(58) Field of Search ............................ 29/403.3, 403.1, 29/402.01, 897.1; 296/35.3, 196; 705/1

(56) References Cited

U.S. PATENT DOCUMENTS 3,783,964 A  *  1/1974  Telesio ........................ 180/294
4,037,302 A  *  7/1977  Hollander .................... 29/403.3
5,819,408 A  * 10/1998  Catlin .......................... 29/897.2

FOREIGN PATENT DOCUMENTS

JP          8-244572        9/1996
JP         411091661     *  4/1999

* cited by examiner

Primary Examiner—John C. Hong
(74) Attorney, Agent, or Firm—Westerman, Hattori, Daniels & Adrian, LLP

(57) ABSTRACT

A method of renovating and recycling a vehicle, comprises the steps of: (a) designing the vehicle, wherein the step of designing comprises the steps of: (a-1) determining a way of treatment, such as melting, crushing or renovating, for mach part of the vehicle; and (a-2) designing each part of the vehicle so as to form an easily disassemblable structure; (b) manufacturing the vehicle according to the design made in the step (a); (c) selling the vehicle with a limited usable period; (d) having the sold vehicle returned after the limited usable period has lapsed; (e) separating parts of the returned vehicle into those to be reused and those to be replaced with new parts; and (f) separating the to-be-replaced parts into those to be renovated or those to be processed into materials. In this ways since the way of treatment for each part of the vehicle is predetermined at the design stage, it is ensured that all the parts can be properly recycled, to thereby substantially eliminate the discarded waste.

7 Claims, 4 Drawing Sheets

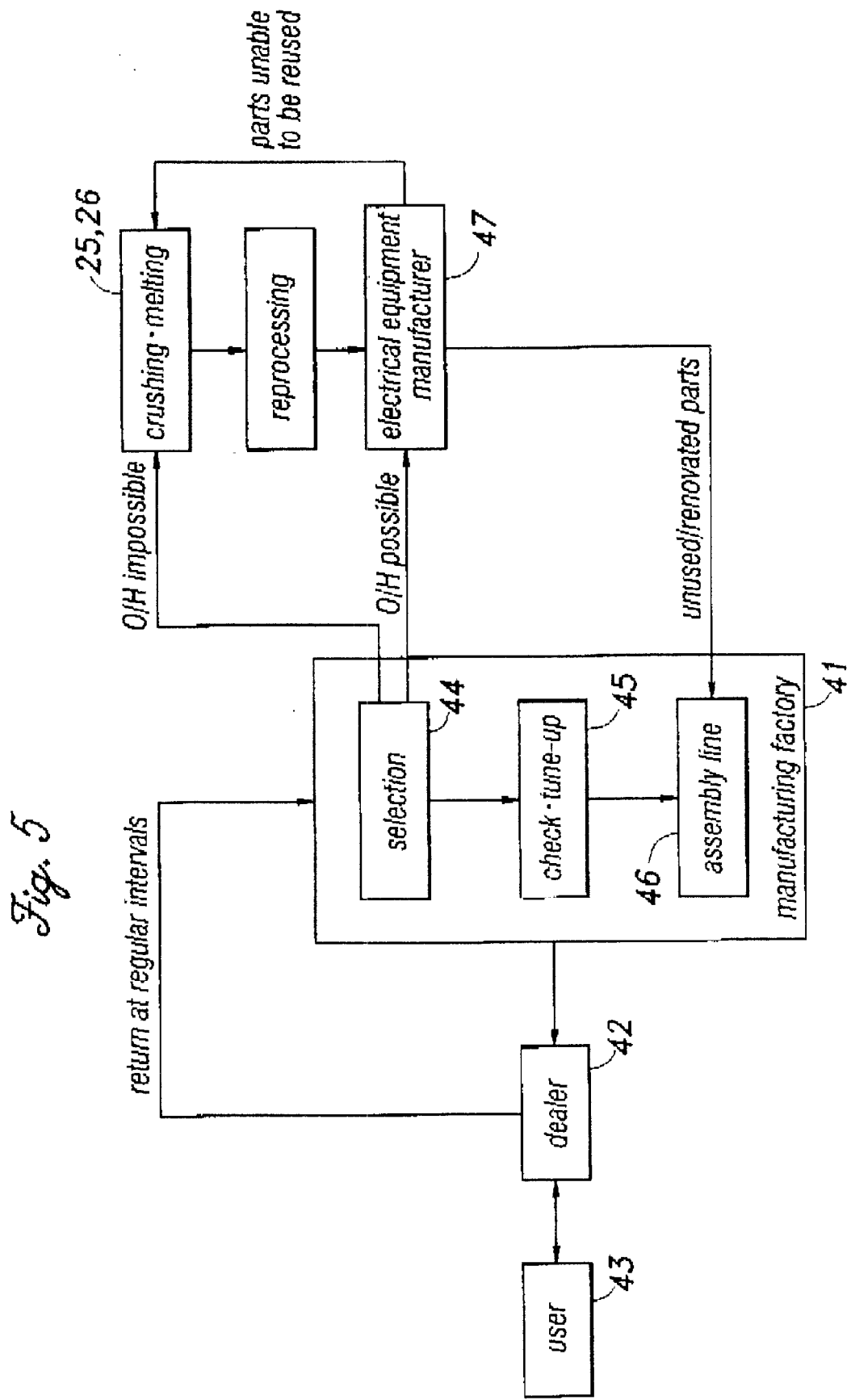

METHOD OF RENOVATING AND RECYCLING A VEHICLE

TECHNICAL FIELD

The present invention relates to a method of renovating and recycling vehicles such as automobiles.

BACKGROUND OF THE INVENTION

Automobiles art required quite high reliability and thus the designed lifetime of the automobiles tends to be excessively long. As a result, usual automobiles may have no operational problems at all when they are disused due to little user needs for them.

On the other hand, manufacturing "disposable" automobiles having a designed lifetime corresponding to a relatively short interval of the user's car-changing cycle may oppose the nowadays trend because such a manufacturing approach does not meet the social requirements of effectively recycling the material to reduce the total amount of discarded waste.

In order to deal with such problems, Japanese Patent Application Laid-Open No. 11-348855 has proposed a method of recycling a disused automobile in that the disused automobile is carried by a loop-type carrier suspended by a hanger, and while the automobile is slowly conveyed through a plurality of stations, parts detached from the disused automobile are divided into to-be-recycled parts and unusable parts and stored accordingly, and the vehicle body is processed by pressing, shearing, etc.

However, this method is just a flow-processing of a conventional one-by-one disused automobile dismantling process mainly carried out manually, and thus cannot sufficiently fulfil the social requirements of effective use of recycled materials and reduction in the total amount of discarded waste.

BRIEF SUMMARY OF THE INVENTION

In view of such problems of the prior art, a primary object of the present invention is to provide a vehicle renovating and recycling method that can satisfy the user's demand of changing cars at short intervals while not opposing the effective usage of resources.

A second object of the present invention is to provide a vehicle renovating and recycling method that can ensure that substantially all the parts of the vehicle are recycled appropriately to thereby eliminate or considerably reduce the discarded waste.

A third object of the present invention is to provide a vehicle renovating and recycling method that can avoid manufacturing the vehicle with excessively high quality and reduce the vehicle manufacturing cost.

A fourth object of the present invention is to provide a vehicle renovating and recycling method that allows the vehicle to be disassembled and recycled at shorter period of time and lower cost.

According to the present invention, such objects can be accomplished by providing a method of renovating and recycling a vehicle, comprising the steps of: (a) designing the vehicle, wherein the step of designing comprises the steps of: (a-1) determining a way of treatment, such as melting, crushing or renovating, for each part of the vehicle; and (a-2) designing each part of the vehicle so as to form an easily disassemblable structure; (b) manufacturing the vehicle according to the design made in the step (a); (c) selling the vehicle with a limited usable period; (d) having the sold vehicle returned after the limited usable period has lapsed; (e) separating parts of the returned vehicle into those to be reused and those to be replaced with new parts; and (f) separating the to-be-replaced parts into those to be renovated or those to be processed into materials.

In this way, since the way of treatment for each part of the vehicle is predetermined at the design stage, it is ensured that all the parts can be properly recycled, to thereby substantially eliminate the discarded waste.

In view of facilitating disassembly of eh vehicle, it will be preferable if the step (a-2) comprises a step of modularzing some of the parts into one or more modules so that the pars in each module can be detached as a batch. According to preferred embodiment of the invention, the modules comprise an engine module, door module and instrument panel module.

Further preferably, the step (a-2) comprises the step of designing each pan of the vehicle so that part, to be treated differently can be detached from each others This ensures that each part can be treated independently from other parts so that each part is treated in a way most appropriate to recycle the same.

The design step (a) may further comprise the step of: (a-3) setting a lifetime for each part based on the limited usable period of the vehicle. In this way, it is possible to set an optimum designed lifetime (durability) for each parts to thereby prevent the total quality of the vehicle from being excessively high and reduce the vehicle manufacturing cost. Owing to the predetermined limited period of use of the vehicle, the user can use the vehicle with high reliability substantially without having to take care of daily maintenance.

In such a case, it is possible that in the step (e), the parts are separated depending on the set lifetime of each part. In this way, a personnel can judge whether a part should be reused or replaced with a new one without carefully inspecting the part, to thereby reduce an effort and time for separating the detached parts of the vehicle. It is also possible, however, that in the step (e), the parts are separated additionally depending on a state of use of each part.

BRIEF DESCRIPTION OF THE DRAWINGS

Now the present invention is described in the following with reference to the appended drawings, in which:

FIG. 5 is a flow diagram of a vehicle renovating and recycling system according to the present invention,

DETAILED DESCRIPTION OF THE PREFERRED EMBODIMENTS

Determining the Way of Treatment

Figure 1:
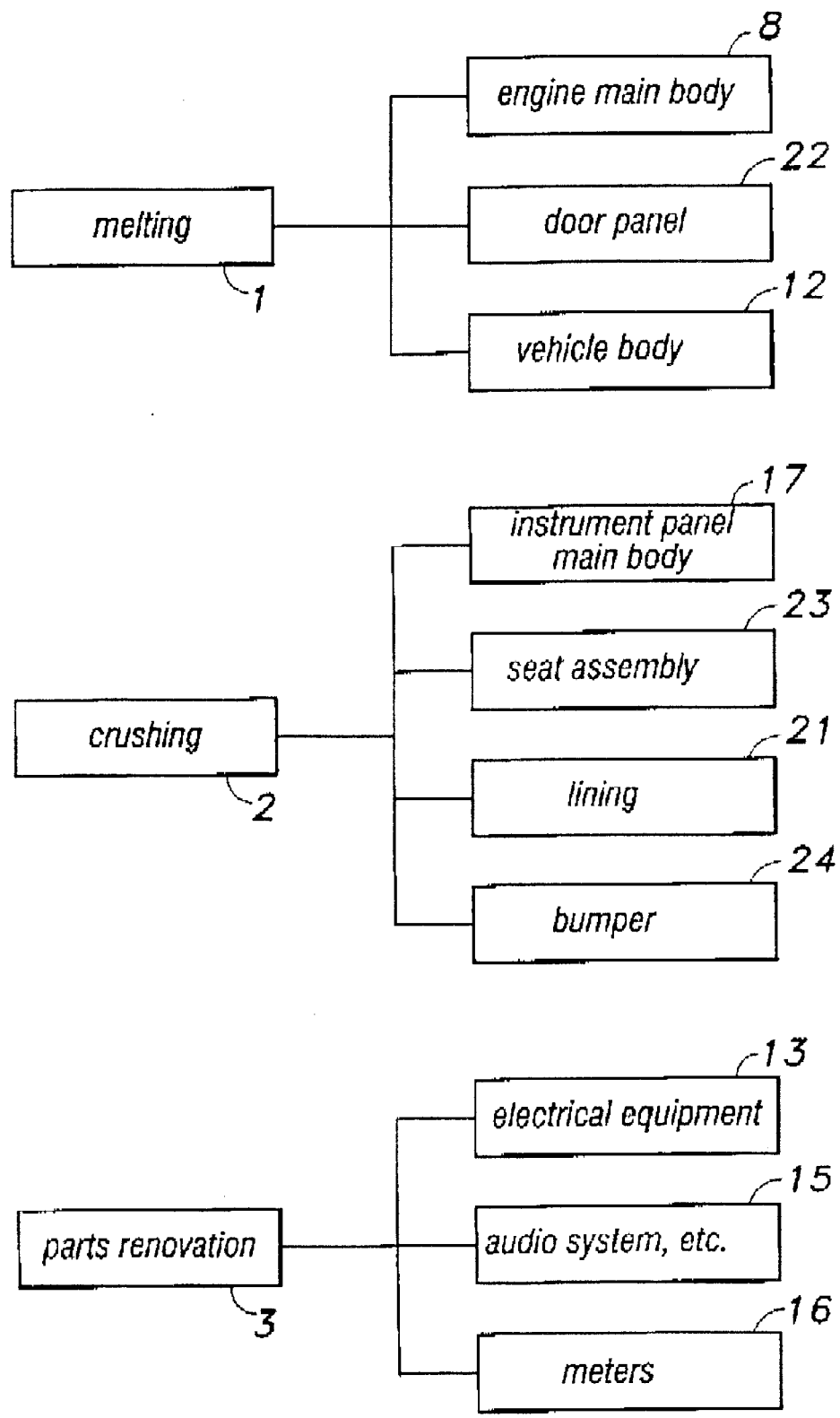
FIG. 1 is a block diagram showing a step of determining a way of treatment for each part.

As shown in FIG. 1, first, a way of treatment such as melting 1, crushing 2, parts renovation 3, etc. is determined for each part of a vehicle such as an automobile.

In this step, parts mainly consisting of a metallic material that can be divided into aluminum, iron and residue by beating and melting are designated as to-be-melted parts; parts that can be divided into metal and non-metal after being crushed into pieces by a crusher are designated as to-be-crushed parts; and parts that each have an independent function as a single unit and that can be reused after overhaul or reassmblage are designated as to-be-renovated parts.

Module Structure Design

Next, some parts are collectively modularized into an engine module 4, door module 5, instrument panel module 6, etc., so that the parts can be handled by batch. In this ways the parts can be detached module by module from a vehicle main body, facilitating the disassembly of the vehicle. Preferably, as many parts that can be treated in a same way of treatment as possible should be incorporated in the same module.

Easy-disassembly Designs

Figure 2:
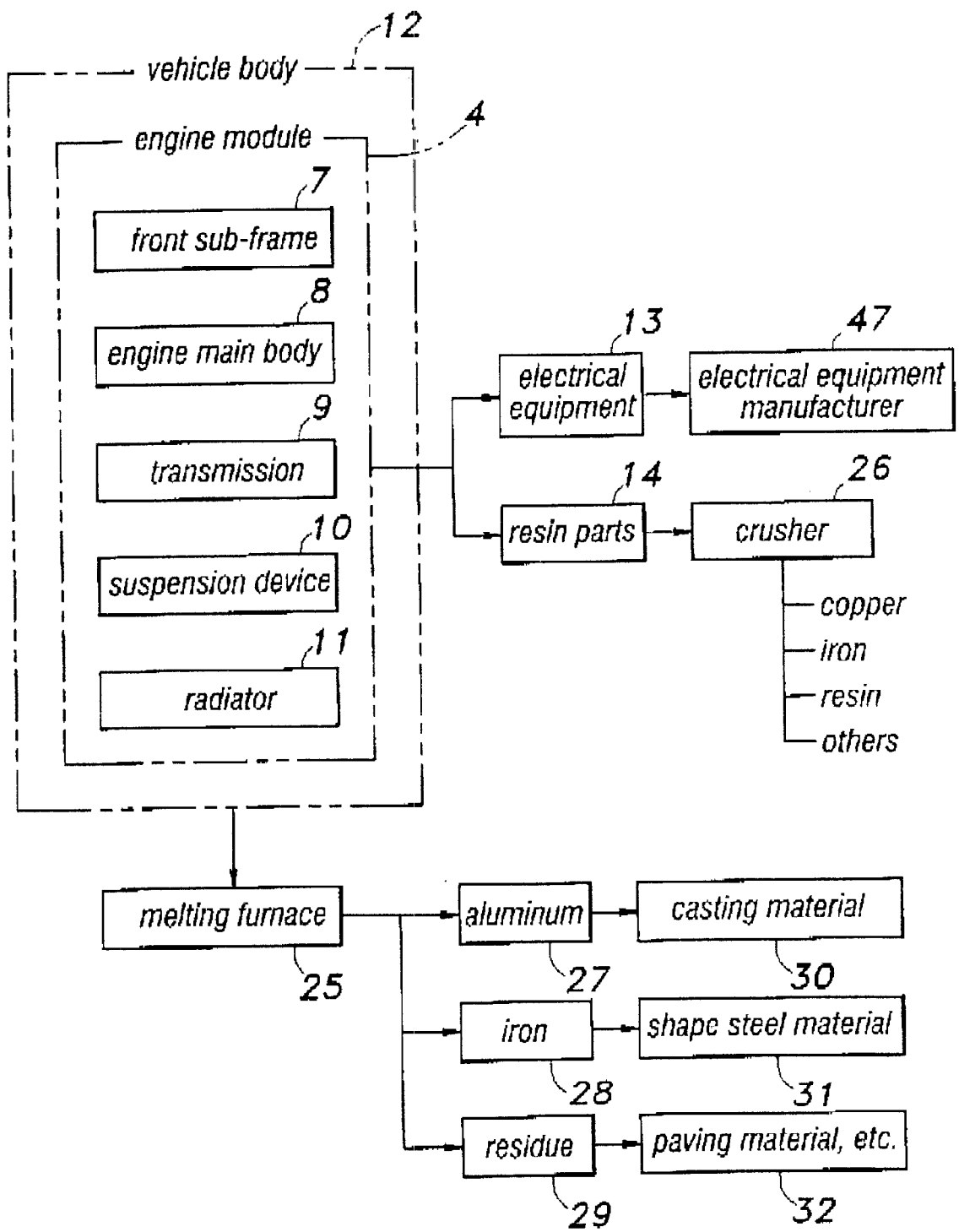
FIG. 2 is a block diagram showing a treatment of a vehicle body and engine module.

According to the present invention, the modules of the vehicle are designed as follows in order to facilitate the disassembly of the vehicle:

As shown in FIG. 2, the engine module 4 is designed such that an engine main body 8, transmission 9, suspension device 10 as well as a radiator II, etc. are disposed on a front subframe 7 that constitutes a part of a vehicle body frame and is secured to the vehicle body 12 by a disengageable joint means such as a bolt and nut, so that the engine main body 8 and the other parts can all be detached from the vehicle main body 12 by just detaching the front sub-frame 7 from the vehicle body 12, At the same time, a design is also made so that detachment of electrical equipment 13 such as an AC electric generator, starter-motor, wiring harnesses, etc. as well as resin parts 14 such as an air cleaner, radiator fan shroud, rubber hose, etc. can be achieved easily.

Figure 3:
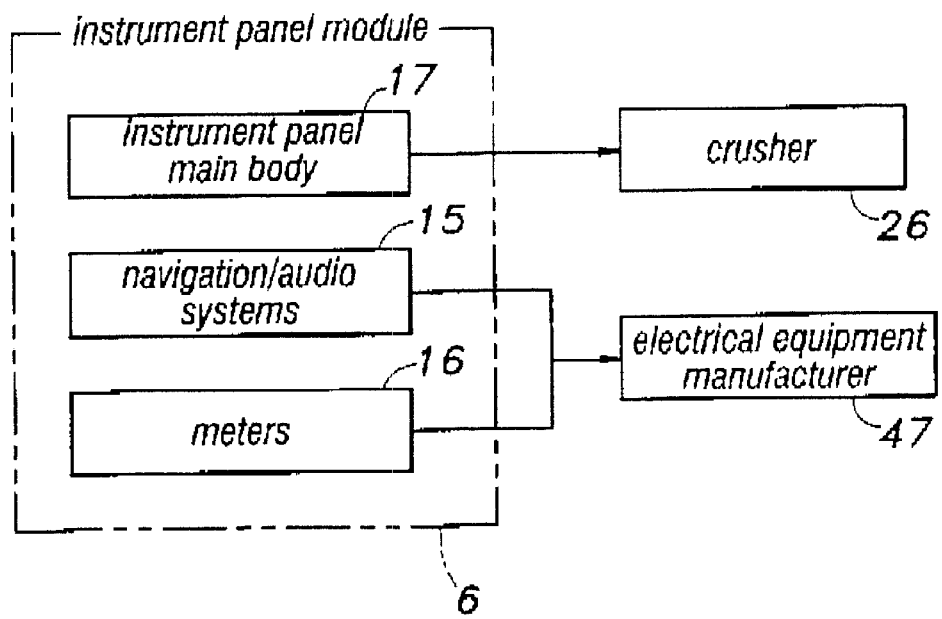
FIG. 3 is a block diagram showing a treatment of an instrument panel module.

As shown in FIG. 3, the instrument panel module 6 is designed so that a first portion 15 comprising electrical equipment such as a car navigation system, audio system, etc. and a second portion 16 comprising meters or the like can be detached as a batch from an instrument panel main body 17 by means of a lock mechanism using a snap-fit lock and an eccentric cam, for example.

Figure 4:
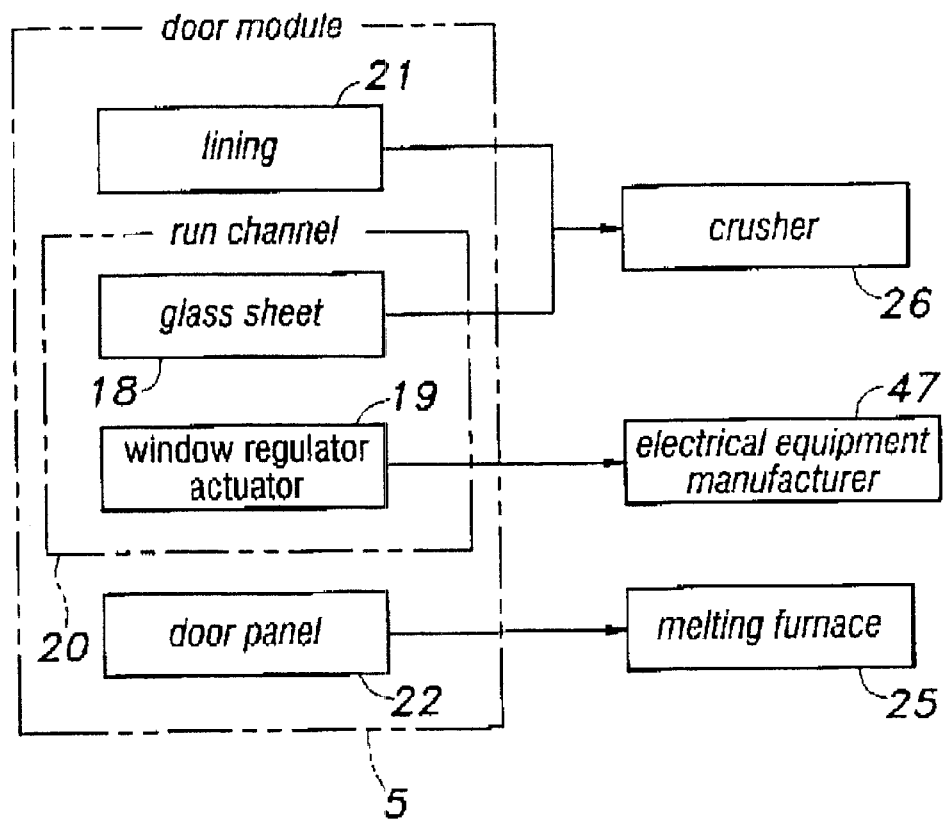
FIG. 4 is a block diagram showing a treatment of a door module.

As shown in FIG. 4, the door module 5 is designed so that a glass sheet 18 and window regulator actuator 19 are attached on a run channel 20 made of a synthetic resin, for example, in such a manner that metallic parts and non-metallic parts can be separated only by detaching the run channel 20 from a door panel 22 after removing a lining 21.

Besides, a floor mat, for example, is provided with a thin fracture portion passing through a hole for connection between a seat and the vehicle body so that the floor mat can be detached by tearing up the thin fracture portion without detaching the seat from the vehicle body. Furthers the electrical equipment of various kinds should use as many flat wire harnesses and one-touch couplers as possible so that the cables can be detached easily.

Material Selection Step

The floor mat or the like, which conventionally comprised separate surface material and lining material, should be made of a single material so long as no problems arise. Further, a cooling water sub-tank and a window washer liquid tank are unified to the radiator fan shroud and a container of an electronic control unit is provided to an air cleaner case so that the parts made of a same material or those that can be processed in a same way of treatment arc made in a unit as much as possible.

Renovating and Recycling Flow

The vehicle designed as above is manufactured at a manufacturing factory 41 which also serves to renovate disused vehicles. In the following, an explanation is made to the renovating and recycling flow of a vehicle with reference to FIG. 5 as well as other drawings.

The manufactured vehicle is sold with a kind of "lease contract" made between a dealer 42 and a user 4: specifying that the vehicle should be returned when its predetermined period of use has lapsed (for instance, when three years has passed or thirty-thousand km traveling distance has been reached). This makes it possible to assign at a design stage an optimum lifetime (or durability) to each part of the vehicle based on the predetermined usable period of the vehicle, to thereby prevent the total quality of the vehicle from being excessively high and reduce the vehicle manufacturing cost.

The vehicle returned from the user 43 to the dealer 42 is sent back to the manufacturing factory 41 where a selection line 44 divides the vehicle parts into those that should be replaced for each cycle (e.g., three years) and those that can be used for several cycles (erg., three cycles (nine years)). In other words, the parts can be separated into the two groups depending on their respective designed lifetime.

When used for less than a prescribed number of cycles, the parts such as a transmission, engine, etc., which are required high rigidity and precision to achieve high reliability and smoothness of operation and thus inevitably result in highly durable design, are reused after they have passed through a check and tune-up line 45. If a damage senior is installed, the data acquired by the sensor over an extended period of time may be used in the selection process. These parts are replaced with new ones, however, when they have been used for more than the prescribed number of cycles (i.e., the lifetime has lapsed) or otherwise dam aged or worn and the overhaul of them would rather increase the cost.

When determined to be replaced, the engine module 4 is put into a melting furnace 25 after the electrical equipment 13 and resin parts 14 have been removed (FIG. 2). The door module S is also put into the melting furnace 25 after the glass sheet 18, window regulator actuator 19 and lining 21 have been removed (FIG. 4). As to the instrument panel module 6, the first portion 15 comprising the navigation system and audio system as well as the second portion 16 comprising the meters are detached from the instrument panel main body 17, and only the instrument panel main body 17 is processed by a crusher 26 (FIG. 3).

The detached electrical equipment 13, audio system, etc. 15 and meters 16 are all returned to an electrical equipment manufacturer(s) 47 except for those that can be determined at a brief visual inspection that they are unable to be reused. Then, the returned parts are renovated according to the standards of the electrical equipment manufacturer 27, and delivered to the manufacturing factory 41 and subsequently installed into vehicles at an assembly line 46.

Synthetic resin parts or fabric parts such as a seat assembly 23, lining 21 and floor mat can be stained relatively easily in daily use, and tend to affect the appearance significantly. This, these parts are all replaced with new parts. And the removed parts are processed by a crusher 26 and recycled as material.

The tiers, hoses, brake pads, etc., which are clearly expendable parts, are all replaced with new parts. The removed parts are processed by the crusher 26 and recycled as material.

Referring to FIG. 2, the vehicle body 12 is divided into a frame and outer plates, and among the outer plates, those that require repairing are reused after being repainted. Those that have a damage or distortion are removed and processed by the melting furnace 25 of by the crusher 26 so that they can be, recycled as material. The vehicle body 12 which has been used for the prescribed number of cycles or has a damage due to a car accident or the like are pressed and put into the melting furnace 25 together with the metallic parts of the engine module 4 and door module 5, and divided into aluminum 27, iron 28 and residue 29. The aluminum 27 is further refined so as to be used as a material 30 for engine casting, etc. The iron 28 is processed at an ironmaster go as to be used as a material 31 for reinforcing bars, shape steel or the like. The residue 29 which may comprise inorganic materials such as glass is reused for example by being mixed into bricks or paving material 32.

The data associated with the state of use and wear acquired at the selection line or the long term data obtained from the damage sensor are fed back to a vehicle development and design department so that the data can be used in optimizing the lifetime of each component part with respect to the prescribed limited period of use.

Thus, according to the present inventions since the way of treatment for each part of the vehicle is predetermined at the design stages it is ensured that all the parts can be properly recycled, to thereby substantially eliminate the discarded waste. Further according to the present invention, due to the predetermined limited usable period of the vehicle, an appropriate lifetime can be set for each part, to thereby avoid excessively high quality or high performance of the vehicle, leading to a lower manufacturing cost. Further, instead of being used until such a state as that the interior has become stained or the vehicle design has become out of fashion is encountered it is ensured that the vehicle is renewed at a prescribed cycle, and therefore, the user can use a highly reliable car substantially without having to take care of daily maintenance. Thus, the present invention can be of great advantage in reducing the manufacturing and maintenance cost as well as in minimizing the amount of waste material.

Although the present invention has been described in terms of a preferred embodiment thereof, it is obvious to a person skilled in the art that various alterations and modifications are possible without departing from the scope of the present invention which is set forth in the appended claims.

What is claimed is:

1. A method of renovating and recycling a vehicle, comprising the steps of:
   (a) designing the vehicle, wherein the step of designing comprises the steps of:
     (a-1) determining a way of treatment for each part of the vehicle; and
     (a-2) designing each part of the vehicle so as to from an easily disassemblable structure such that parts to be treated differently can be detached from each other;
   (b) manufacturing the vehicle according to the design made in the step (a);
   (c) selling the vehicle;
   (d) having the sold vehicle returned;
   (e) separating parts of the returned vehicle into those to be reused and those to be replaced with new parts; and
   (f) separating the to-be-replaced parts into those to be renovated or those to be processed into materials; wherein
     the step (c) comprises the step of selling toe vehicle with a limited useable period;
     the step (d) comprises the step of having the sold vehicle returned after the limited useable period has lapsed; and
     the step (a) further comprises the step of:
     (a-3) setting a lifetime for each part based on the limited usable period of the vehicle.

2. A method of renovating and recycling a vehicle according to claim 1, wherein the way of treatment comprises either one of melting, crushing or renovating.

3. A method of renovating and recycling a vehicle according to claim 1, wherein the step (a-2) comprises a step of modularizing some of the parts into one or more modules so that the parts in each module can be detached as a batch.

4. A method of renovating and recycling a vehicle according to claim 3, wherein the modules comprise an engine module, door module and instrument panel module.

5. A method of renovating and recycling a vehicle according to claim 1, wherein in the step (e), the parts are separated depending on the set lifetime of each part.

6. A method of renovating and recycling a vehicle according to claim 5, wherein in the step (e), the parts are separated also depending on a state of use of each part.

7. A method of renovating and recycling a vehicle according to claim 1, further comprising the step of:
   (g) manufacturing a vehicle using the parts separated into the group of parts to be reused in the step (e).

* * * * *